Jan. 9, 1951 D. L. HINGS 2,537,760

AMPLIFIER WAVE INVERTER

Filed Aug. 6, 1945 2 Sheets-Sheet 1

INVENTOR
Donald L. Hings
BY Spaulding and Kroot.
ATTORNEYS.

Jan. 9, 1951 D. L. HINGS 2,537,760

AMPLIFIER WAVE INVERTER

Filed Aug. 6, 1945 2 Sheets-Sheet 2

INVENTOR
Donald L. Hings
BY Spadding and Kroot
ATTORNEYS.

Patented Jan. 9, 1951 2,537,760

UNITED STATES PATENT OFFICE 2,537,760

AMPLIFIER WAVE INVERTER

Donald L. Hings, Ottawa, Ontario, Canada, assignor, by mesne assignments, to Cornell-Dubilier Electric Corporation, South Plainfield, N. J., a corporation of Delaware Application August 6, 1945, Serial No. 609,263
In Canada July 20, 1945

6 Claims. (Cl. 250—20)

My invention relates in general to wave inverters and more particularly to an amplifier wave inverter adapted to construct or generate a secondary modulated carrier wave which is the inverse to an original modulated carrier wave.

An object of my invention is to provide for subtracting the voltage of a modulated carrier wave from the voltage of a secondary source comprising an alternating current having a frequency within the carrier spectrum whereby the resultant voltage produces a wave which is inverse to the modulated carrier wave.

Another object of my invention is to provide for controlling the amplification operation performed in amplifying a modulated carrier wave in such a manner that the amplification operation is influenced by a secondary voltage source having a frequency within the spectrum range of the carrier wave, whereby a resultant voltage is produced for giving a secondary wave form that is the inverse of the original modulated carrier wave.

Another object of my invention is to provide for controlling the operation of an amplifier that is adapted to detect a modulated carrier wave in which the amplifier is preferably subjected to a square wave voltage having an amplitude greater than the maximum amplitude of the modulated carrier wave, whereby a resultant voltage is produced that generates a wave which is the inverse to the modulated carrier wave.

Another object of my invention is the provision of a circuit having a first carrier wave source and a second carrier wave source in which the second carrier wave source is of a lower frequency and having a substantially square top wave, taken in combination with means for subtracting the voltage of the first carrier wave source from the second carrier wave source, thereby producing a resultant voltage which generates a wave which has an inverse amplitude to that of the first carrier wave.

Another object of my invention is to provide for obtaining an inverse modulated carrier wave from a primary modulated carrier source and from a secondary carrier wave source by a circuit which includes an amplifier tube having the cathode thereof modulated, in which the tube is driven either by a cathode drive or a grid drive and in which the grid drive or the cathode drive is excited by the differential voltage between the primary carrier wave source and the secondary carrier wave source, having a frequency different from the frequency of the primary modulated carrier wave source.

Other objects and a fuller understanding of my invention may be had by referring to the following description and claims, taken in conjunction with the accompanying drawing, in which:

Figure 1:
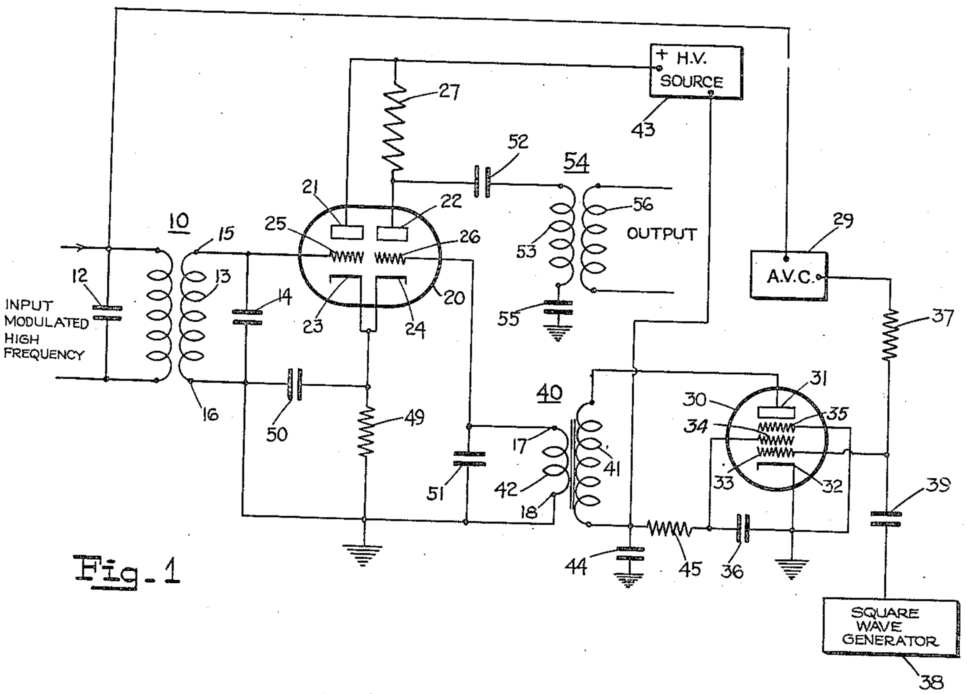
Figure 1 shows a diagrammatic illustration of a circuit embodying the features of my invention.
Figure 3:
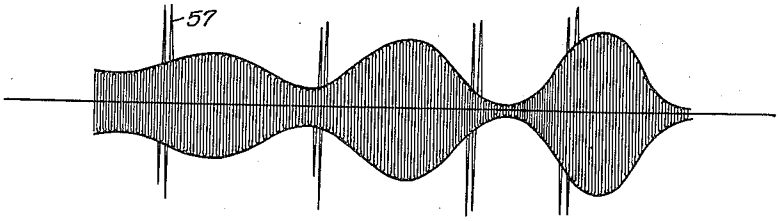
Figure 3 is a wave representation of a modulated carrier wave having super-imposed thereon spurious interference waves.

With reference to Figure 1 of the drawing the reference character 10 represents a transformer having a primary winding 11 and a secondary winding 13, in which the primary winding is adapted to be energized by incoming modulated carrier waves such as shown in Figure 3 of the drawing. A condenser 12 is connected across the primary winding 11 and constitutes, in combination with the primary winding, a resonant circuit which is tuned substantially to resonance at a frequency equal to the frequency of the incoming carrier waves. Similarly, a condenser 14 is connected across the secondary winding 13 and constitutes, in combination with the secondary winding, a resonant circuit which is tuned substantially to resonance at a frequency equal to the incoming carrier wave frequency. The incoming carrier wave frequency which is supplied to the transformer 10 may be referred to as a first or primary carrier wave source.

In my invention, I provide for subtracting the voltage of the modulated carrier wave of the primary source from the voltage of a secondary carrier wave source which is preferably a square top wave, such as may be provided by a square wave generator illustrated by the blo k 38 in Figure 1 of the drawing. The square wave generator may be of any suitable type, and I preferably make the frequency of the square wave generator lower than the frequency of the primary source, and is regulated by an automatic volume control circuit, indicated by the block 29, to have a voltage which is slightly greater than the maximum voltage of the modulated primary carrier wave source. The automatic volume control circuit is responsive to the power of the modulated primary carrier wave source, and may have a normal time constant, for example, one quarter second.

Figure 4:
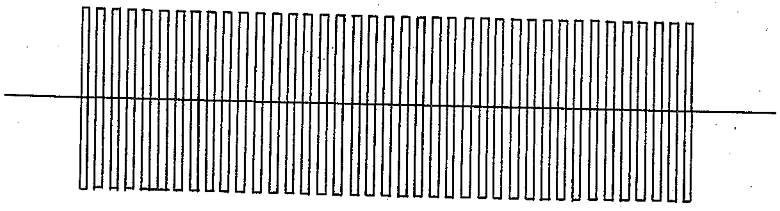
Figure 4 is a wave representation of a second source of carrier waves having a square top amplitude.

The square wave voltage delivered by the square wave generator 38 is illustrated in Figure 4 and is adapted to be amplified by an amplifier tube 30 having a plate 31, a cathode 32, a control grid 33, a screen grid 34 and a suppressor grid 35. The control grid 33 is coupled to the square wave generator 38 by a coupling condenser 39. The excitation of the control grid 33 may also be regulated by an automatic volume control circuit, designated by the reference character 29. The resistor 37, which interconnects the control grid 33 and the automatic volume control 29, is a grid resistor. The screen grid 34 is by-passed to the cathode for radio frequency through a by-pass condenser 36. The suppressor grid 35 is directly connected to the cathode 32 of the amplifier tube. The resistor 45 is a screen dropping resistor and is connected to the high voltage source 43. The plate 31 of the amplifier tube 30 is connected to the upper end of a primary winding 41 of a coupling transformer 40. The lower end of the primary winding is connected to ground for carrier wave frequency through the coupling condenser 44.

Figure 5:
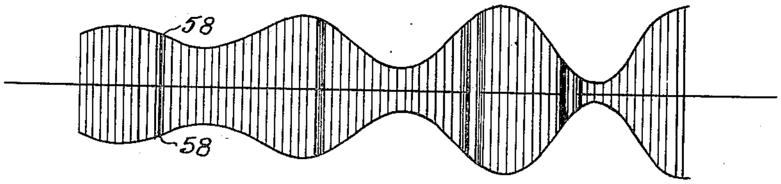
Figure 5 illustrates the resultant wave that has an amplitude which is inverse to the amplitude of the modulated carrier wave of Figure 3.

I provide for subtracting the voltage of the modulated carrier wave in the transformer 10 from the secondary carrier wave voltage in the transformer 40 by means of an amplifier tube 20, whereby the resultant voltage generates a wave such as shown in Figure 5 of the drawing. The amplifier tube 20 comprises two plates 21 and 22, two cathodes 23 and 24 which may be constructed as a common cathode, and two grids 25 and 26. The plate 21 is connected to the high voltage source 43 and the plate 22 is connected to the high voltage source 43 through a plate load resistor 27. The grid 25 is connected to the upper terminal 15 of the secondary winding 13 of the transformer 10. The grid 26 is connected to the upper terminal 17 of the secondary winding 42 of the transformer 40. The two cathodes 23 and 24 are connected together and to ground through a cathode bias and load resistor 49. The cathodes are also connected to the lower terminal 16 of the secondary winding 13 through a high frequency by-pass condenser 50. The secondary winding 42 of the transformer 40 has a condenser 51 connected across the terminals 17 and 18, and the condenser 51, in combination with the secondary winding 42, constitutes a resonant circuit which is tuned substantially to resonance at a frequency equal to the frequency of the secondary carrier source of the square wave generator 38. The plate 22 of the amplifier tube 20 is connected to the primary winding 53 of an output transformer 54 through means of a coupling condenser 52. The output is delivered by the secondary winding 56 of the output transformer 54. The primary winding 53 has a condenser 55 connected in series therewith and the two comprise a series resonant circuit which is tuned substantially to the frequency of the secondary carrier wave supplied by the square wave generator 38 to the secondary winding 42 of the transformer 40.

In operation, with the primary carrier frequency wave unmodulated and exciting the transformer 10 and with the secondary carrier wave from the square wave generator 38 exciting the transformer 40, the tube 20 and the associated circuits are such that direct current flows through the cathode load and biasing resistor 49 and through the plate load resistor 27. High frequency energy from the transformer 10 flows through the cathode-to-plate circuit 23—21 of the tube 20 and high frequency energy from the transformer 40 flows through the cathode-to-plate circuit 24—22 of the tube 20. During the periods of the positive half of the cycle of the primary carrier wave source, the transformer 10 excites the grid 25 and causes an increased amount of current to flow through the cathode load and biasing resistor 49 which inversely varies the bias existing between the cathode 24 and the grid 26 of the tube 20. The application of an inverse bias upon the cathode 24 and the grid 26 causes a reduction in the secondary carrier wave current flowing between the cathode 24 and the plate 22. The reduction in the flow of the secondary carrier wave current is inverse to the increase in the flow of primary carrier wave current caused by the positive half cycle of the modulation of the primary carrier wave source. This inverse effect of the secondary carrier wave current excites the primary winding 53 of the output transformer 54, with the result that the output voltage across the secondary winding 56 generates a wave which modulation envelope is inverse to the modulation of the primary carrier wave source in the transformer 10.

During the periods of the negative half of the modulation cycle of the primary carrier wave source, the transformer 10 biases the grid 25 in such direction as to decrease the flow of current through the cathode load and biasing resistor 49. This decrease in current through the resistor 49 decreases the bias between the cathode 24 and the grid 26, with the result that increased current flows between the cathode 24 and the plate 22. The increased current excites the primary winding 53 of the coupling transformer 54, with the result that the output voltage across the secondary winding 56 generates a wave which is inverse to the modulation of the primary carrier wave source. Accordingly, my invention provides for producing a secondary modulated carrier wave in the secondary winding 56 of the output transformer 54, which envelope is inverse to the envelope of the primary modulated carrier wave in the transformer 10. The Figure 5 represents the reconstructed inverse modulated wave and designates the voltage across the output winding 56. The combination of the cathode-to-plate circuit 23—21 as controlled by the grid 25, the cathode load and biasing resistor 49 and the cathode-to-plate circuit 24—22 as controlled by the grid 26 provides for producing a subtraction method whereby the resultant voltage is the differential between the primary carrier wave source and the secondary carrier wave source. Inasmuch as the primary carrier wave source is fed into the resonant circuit composing the elements 13 and 14 and inasmuch as the secondary carrier wave source is fed into the resonant circuit comprising the elements 42 and 51, the two sources may be characterized as being solid and stable, and thus the function of the tube 20 which is responsive to the differential voltage between the two sources is such as to give a good linear inverse reproduction to the primary modulated carrier wave. While I have described by invention as preferably employing a second carrier wave source of the type having a square top wave, yet the circuit may be operative with a sinusoidal wave.

When a spurious interference wave 57 such as shown in Figure 3 is received by my circuit, the amplifier tube 20 operates to limit the amplitude of the spurious interference energy. During the process of limiting the amplitude of the spurious energy, the grid 25 is biased highly positive, with the result that the current momentarily increases through the load and biasing resistor 49 with the result that the bias between the cathode 24 and the grid 26 increases to a point of cut-off for the cathode-to-plate circuit 24—22 and thereby limits the value of the spurious interference wave. It is to be noted that the limited spurious interference wave produces, so to speak, a slot or depression in the resultant modulated inverse carrier wave as shown in Figure 5 at 58. The Figure 5 shows the inversely modulated voltage wave as it appears on an oscilloscope. In actual operation, from the standpoint of reception, the two slots or depressions 58 in Figure 5 occur at the same time and have substantially the same amplitude, with the result that, when the inverse envelope is received upon the receiver, the operator or the listener cannot hear any appreciable noise disturbance to distort the intelligence. Thus, in my invention, the spurious interference wave energies as found in ordinary reception are limited and inverted so that the intelligence controls the noise, instead of the noise controlling the intelligence.

Figure 2:
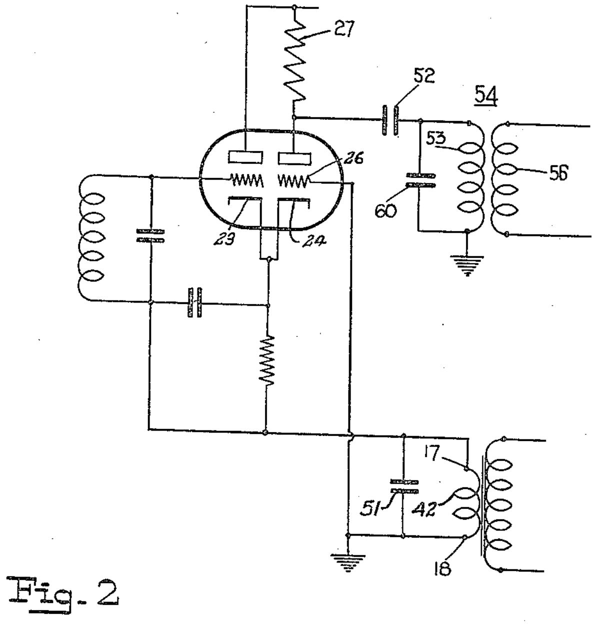
Figure 2 is a modification of the invention shown in Figure 1.

In Figure 2, I show a modification of the circuit in Figure 1, in that the cathodes 23 and 24 are by-passed to ground for the modulation frequency through the resonant circuit containing the elements 42 and 51. Another modification resides in the fact that the grid 26 is connected to ground. The output transformer 54 in Figure 2 has a condenser 60 in parallel with the primary winding 53 to produce a parallel resonant circuit instead of a series resonant circuit as shown in Figure 1. The operation of the circuit in Figure 2 is substantially the same as that shown in Figure 1, with the exception that the secondary carrier wave source excites the cathode for making a cathode drive whereas in Figure 1 the secondary carrier wave source excited the grid for making a grid drive.

Although I have shown and described my invention with a certain degree of particularity, it is understood that changes may be made therein without departing from the spirit of the invention which are included within the scope of the claims hereinafter set forth.

I claim as my invention:

1. A wave inverter system comprising, in combination, a primary carrier wave source and a secondary carrier wave source having a frequency of a different value than that of the primary carrier wave source, means for regulating the amplitude of the voltage of the secondary carrier wave source at a value greater than the maximum amplitude of the voltage of the primary carrier wave source, an amplifier circuit including at least a first cathode-to-plate circuit having a grid and a second cathode-to-plate circuit having a grid, means for relatively exciting the grid and cathode of the first cathode-to-plate circuit by energy from the primary carrier wave source and means for relatively exciting the grid and cathode of the second cathode-to-plate circuit by energy from the secondary carrier wave source, an impedance connected in both said first and second cathode-to-plate circuits, means for modulating the two cathodes by modulation energy from the primary carrier wave source, an output circuit having at least a resonant circuit connected to the second cathode-to-plate circuit, and by-pass means shunting said impedance, said by-pass means presenting a different value of impedance to said primary carrier waves than to said secondary carrier waves.

2. A wave inverter system comprising, in combination, a primary carrier wave source and a secondary carrier wave source having a frequency of a lower value than that of the primary carrier wave source, means for regulating the amplitude of the voltage of the secondary carrier wave source at a value greater than the maximum amplitude of the voltage of the primary carrier wave source, an amplifier circuit including at least a first cathode-to-plate circuit having a grid and a second cathode-to-plate circuit having a grid, means for relatively exciting the grid and cathode of the first cathode-to-plate circuit by energy from the primary carrier wave source and means for relatively exciting the grid and cathode of the second cathode-to-plate circuit by energy from the secondary carrier wave source, an impedance connected in both said first and second cathode-to-plate circuits, means for modulating the two cathodes by modulation energy from the primary carrier wave source, an output circuit having a series resonant circuit connected to the second cathode-to-plate circuit, and by-pass means shunting said impedance, said by-pass means presenting a lower impedance to said primary carrier waves than to said secondary carrier waves.

3. A wave inverter system comprising, in combination, a primary carrier wave source and a secondary carrier wave source having a frequency of a lower value than that of the primary carrier wave source, means for regulating the amplitude of the voltage of the secondary carrier wave source at a value greater than the maximum amplitude of the voltage of the primary carrier wave source, an amplifier circuit including at least a first cathode-to-plate circuit having a grid and a second cathode-to-plate circuit having a grid, means for exciting the grid of the first cathode-to-plate circuit by energy from the primary carrier wave source and means for exciting the grid of the second cathode-to-plate circuit by energy from the secondary carrier wave source, means for modulating the two cathodes by modulation energy from the primary carrier wave source, an output circuit having at least a resonant circuit connected to the second cathode-to-plate circuit, said secondary modulated carrier wave being a substantially square wave.

4. An amplifier wave inverter, including a first and a second wave input circuit each having first and second ends, a first and a second wave source for energizing, respectively, said first and second wave input circuits, said first and second wave input circuits being antiresonant, respectively, substantially at the frequency of the said first and second wave source, a resonant output circuit being resonant substantially at the frequency of the said second wave source, a first and a second thermionic tube having first and second cathodes, grids and anodes, respectively, first connection means for connecting said first wave input circuit between said first grid and first cathode, second connection means for connecting said second wave input circuit between said second grid and second cathode, third connection means for interconnecting said cathodes, fourth connection means for connecting said output circuit between said second plate and a point of reference potential, a biasing resistor for connecting said interconnected cathodes to said point of reference potential and to said second end of said first wave input circuit, a load resistor for interconnecting said plates, first wave bypass means shunting said biasing resistor, said first wave bypass means presenting a higher impedance to said second wave than to said first wave, and means for automatically controlling the amplitude of said second wave in accordance with the amplitude of said first wave.

5. A system for inverting the modulation component of a modulated carrier wave, said system comprising, a secondary carrier square wave source having a lower frequency and a greater amplitude than said modulated carrier wave, an impedance, means for providing a voltage across said impedance in accordance with the modulation component of said modulated carrier wave, an amplifier having an anode, a cathode and a control electrode, a control electrode-cathode circuit for said amplifier including said impedance, means for impressing said secondary carrier square wave on said control electrode-cathode circuit, resonant output circuit means connected in the anode-cathode path of said amplifier, and means for regulating the amplitude of said secondary carrier square wave in accordance with the amplitude of said modulated carrier wave.

6. A system for inverting the modulation component of a modulated carrier wave, said system comprising, a secondary carrier square wave source having a lower frequency and a greater amplitude than said modulated carrier wave, a detector tube having a cathode load impedance, means for applying said modulated carrier wave to said detector tube to provide a voltage across said load impedance in accordance with the modulation component of said modulated carrier wave, an amplifier having an anode, a cathode, and a control electrode, a control electrode-cathode circuit for said amplifier including said impedance, means for impressing said secondary carrier square wave on said control electrode-cathode circuit, resonant output circuit means connected in the anode-cathode path of said amplifier, and means for regulating the amplitude of said secondary carrier square wave in accordance with the amplitude of said modulated carrier wave.

DONALD L. HINGS.

REFERENCES CITED

The following references are of record in the file of this patent:

UNITED STATES PATENTS

| Number | Name | Date |
|---|---|---|
| 2,136,479 | Trevor | Nov. 15, 1938 |
| 2,144,995 | Pulvermacher | Jan. 24, 1939 |
| 2,221,795 | Haffcke | Nov. 19, 1940 |
| 2,263,276 | Pulley | Nov. 18, 1941 |
| 2,265,996 | Bumlein | Dec. 16, 1941 |
| 2,297,931 | White | Oct. 6, 1942 |
| 2,396,224 | Artzt | Mar. 12, 1946 |
| 2,396,395 | Smith et al. | Mar. 12, 1946 |
| 2,420,268 | Sontheimer | May 6, 1947 |
| 2,432,720 | Brown | Dec. 16, 1947 |
| 2,469,747 | Shenk | May 10, 1949 |